US008617283B2

(12) United States Patent
Mora et al.

(10) Patent No.: US 8,617,283 B2
(45) Date of Patent: Dec. 31, 2013

(54) USE OF A SOLID MINERAL COMPOSITION FOR INCREASING THE FERTILITY OF A CROP SOIL OR THAT OF A PRAIRIE SOIL

(75) Inventors: Philippe Mora, La Varenne Saint Hilaire (FR); Miambi Edouard, Gif sur Yvette (FR); Roy Virginie, Versailles (FR); Stephanie Giusti, Villeneuve Saint Georges (FR); Didier Blin, Bussy Saint Georges (FR); Thibaut Veyrier, Corvol l'orgueilleux (FR); Bruno Daridon, Malzeville (FR)

(73) Assignee: PRP Holding, Paris (FR)

( * ) Notice: Subject to any disclaimer, the term of this patent is extended or adjusted under 35 U.S.C. 154(b) by 400 days.

(21) Appl. No.: 13/055,994

(22) PCT Filed: Jul. 28, 2009

(86) PCT No.: PCT/FR2009/051515
§ 371 (c)(1),
(2), (4) Date: Jan. 26, 2011

(87) PCT Pub. No.: WO2010/012952
PCT Pub. Date: Feb. 4, 2010

(65) Prior Publication Data
US 2011/0209510 A1    Sep. 1, 2011

(30) Foreign Application Priority Data
Jul. 28, 2008   (FR) .................................... 08 55169

(51) Int. Cl.
  C05F 11/00    (2006.01)
  C05F 11/02    (2006.01)
  C05F 7/00     (2006.01)

(52) U.S. Cl.
  USPC ........................................ 71/23; 71/24; 71/25

(58) Field of Classification Search
  USPC ......................................................... 71/21–35
  See application file for complete search history.

(56) References Cited

U.S. PATENT DOCUMENTS

| 4,273,570 A | 6/1981 | Deubler |
| 5,041,153 A | 8/1991 | Detroit |

FOREIGN PATENT DOCUMENTS

| DE | 4021416 C1 | 9/1991 |
| DE | 102005031397 A1 | 1/2007 |
| DE | 102005033595 A1 | 2/2007 |

OTHER PUBLICATIONS

International Search Report, dated Jan. 12, 2010, from corresponding PCT application.

*Primary Examiner* — Jennifer Smith
(74) *Attorney, Agent, or Firm* — Young & Thompson

(57) ABSTRACT

A solid mineral composition including the following formula (I):
  Calcium carbonate from 4.58% to 77.8%,
  Dolomite from 3.85% to 69.29%,
  Rock salt from 5.7% to 12.4%,
  Lignosulphate from 4.25% to 8.49%,
  Potassium sulphate from 0.37% to 2.44%,
  Magnesium oxide from 0.01% to 0.07%, and
  Elemental sulphur from 0.009% to 0.066%,
the above percentages consisting of the weight percentages of each of the compounds, relative to the total weight of the the mineral composition dry matter, for increasing the fertility of a soil by causing an increase in at least one enzymatic activity contained in the soil, selected from (i) phosphatase, (ii) β-xylosidase, (iii) α-glucosidase and (iv) β-glucosidase.

20 Claims, 11 Drawing Sheets

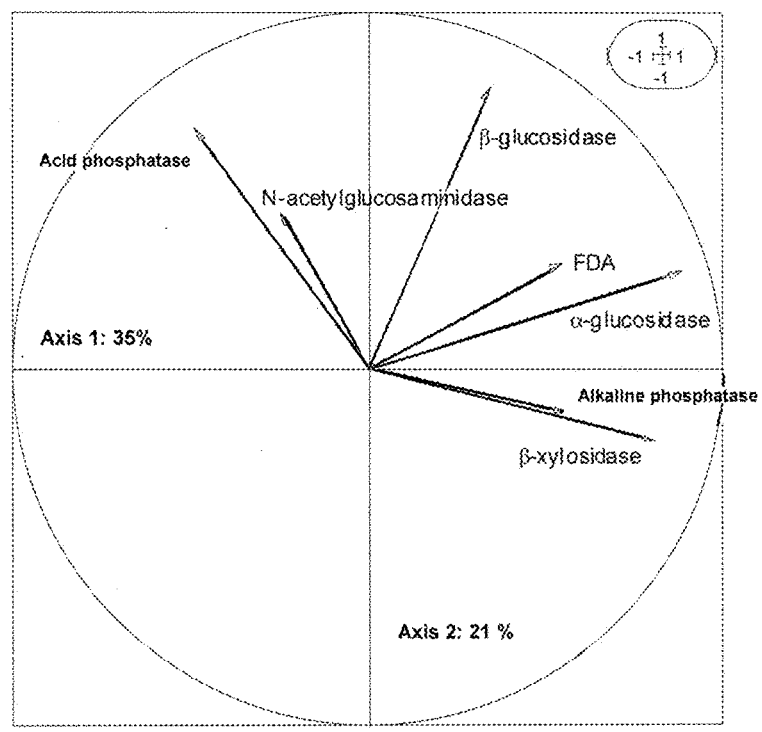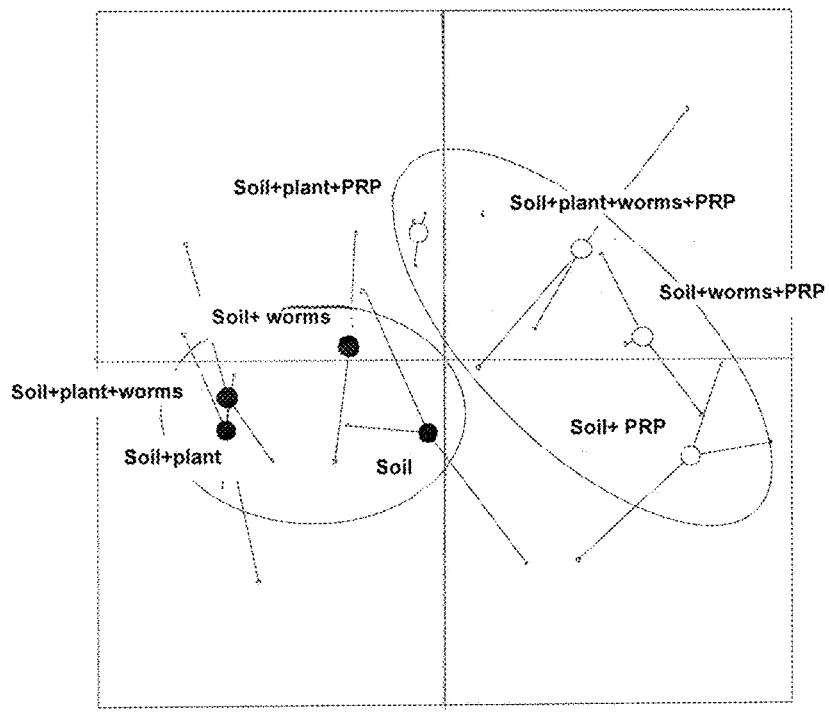
Figures 2A (upper part) and 2B (lower part)

SEQUENCE LISTING

<160> NUMBER OF SEQ ID NOS: 2

<210> SEQ ID NO 1
<211> LENGTH: 17
<212> TYPE: DNA
<213> ORGANISM: Artificial Sequence
<220> FEATURE:
<223> OTHER INFORMATION: Synthetic Primer

<400> SEQUENCE: 1
attaccgcgg ctgctgg                                                17

<210> SEQ ID NO 2
<211> LENGTH: 60
<212> TYPE: DNA
<213> ORGANISM: Artificial Sequence
<220> FEATURE:
<223> OTHER INFORMATION: Synthetic Primer

<400> SEQUENCE: 2
cgcccgccgc gcgcggcggg cggggcgggg gcacgggggg actcctacgg gaggcagcag    60

USE OF A SOLID MINERAL COMPOSITION FOR INCREASING THE FERTILITY OF A CROP SOIL OR THAT OF A PRAIRIE SOIL

FIELD OF THE INVENTION

The present invention relates to the field of agriculture and horticulture, and more precisely to the field of fertilizer compositions used especially in agriculture, horticulture, arboriculture or for pastures and meadows.

PRIOR ART

It is well known in the state of the art to use organic or inorganic compositions dispersed onto the surface of crop soils so as to increase the fertility thereof.

Thus, a plurality of organic or inorganic fertilizer compositions is known and have been used for a very long time in agriculture, horticulture and arboriculture.

To be fertile, a soil should have an optimal balance between its organic and inorganic components.

There is no definition today of the exact characteristics making it possible to univocally qualify the fertility of a soil.

However, a measure of the biological activity of animal organisms, vegetal organisms and microorganisms contained in a soil is increasingly taken into account to materialize the self-restoring capacity of the soil, which correlates with the fertility properties thereof. For example soil, one may mention fertility tests based upon measuring the carbon dioxide production of a sample that is representative of said soil.

According to other studies, the quality of a soil, and therefore the fertility properties thereof, are, at least for part of them, linked to the enzymatic activity of said soil, which especially reflects its microbial activity.

Studying the impact of the fertilization modes on microflora and on the soil enzymatic activities consists in an usual approach as regards organic fertilizing materials (compost, manure, liquid or semi-liquid manure, straw, green manures . . . ) since such materials represent a direct source of nutrients, i.e. carbon and nitrogen sources for microorganisms living in the soil.

Some studies demonstrate that microflora in agricultural soils is quantitatively and qualitatively lesser than that of corresponding original forest soils.

The soil microflora study may be performed using various methods, including total extraction through fumigation-extraction, measurement of the global respiratory or mineralizing activity of the soil, flow cytometry, extraction and culture of the revitalizable total microflora, analysis of markers specific to some populations such as fatty acids, sterols such as ergosterol, microplate metabolic profiles, analysis of soil extract's enzymatic activities, or more recent technics such as the extraction of total nucleic acids from soil (metagenome) thereafter the specific amplification of genes encoding ribosomal RNA (16S for bacteria or 18S for fungi) by PCR (Polymerase Chain Reaction), followed with a DGGE assay (Denaturing Gradient Gel Electrophoresis) of the amplified fragments.

It is commonly considered in the prior art that enzymatic activities may represent a significant indicator of the biological activity of a soil, due to the fact that the enzymatic reactions are involved in the dynamics of nutrients recycling and in the energy transfer to multicellular vegetal organisms.

It is generally admitted that enzymatic reactions are intimately associated with the fertility quality of a soil, because the enzymatic reactions perform the conversion of non-metabolizable forms of some nutrients to forms that are directly available to plants and to microbial biomass. In particular, enzymes from the soil do take part to the decomposition and synthesis of organic materials that are important for plant growth, and that are not synthesized by plants themselves.

In other words, the enzymatic activity reflects the strength as well as the nature of the biochemical processes which occur within the soil matrix. For this reason, the enzymatic activity represents an indicator of the biological capacity of a soil to perform biochemical processes which are important for the preservation of the fertility properties thereof.

For fertilizing soils, adding exogenous organic material (liquid or semi-liquid manure, compost, manure, sludge) contributes to short- and mid-term biodiversity, but the microflora composition seems to return to an initial "balance composition" after a period of several weeks or months following the organic fertilizer supply. There are many works dealing with microflora and the decomposition dynamics of organic materials supplied to soil or dealing with sludge derived from heavy metal-rich organic urban wastes.

Published prior works about the effects of inorganic fertilizing materials on microflora and on soil enzymatic activities are much more rare and existing studies are mainly focused on nitrogen-based fertilizers, on the impact of heavy metals, on the consequences of trace element doses accumulated in agricultural soils due to an intensive and repeated fertilization, as is the case with copper which has been and is still extensively used in phytosanitary formulations, especially for vineyard. Some studies may also be mentioned dealing with the addition of inorganic compounds such as gypsum and ferrihydrite, the impact of which has been evaluated on methane-producing bacteria populations in the soil of paddy fields.

There is however a constant need in the state of the art for compositions intended to maintain or to increase the fertility of a soil, and having beneficial properties as regards the enzymatic activity of said soil.

SUMMARY OF THE INVENTION

It is an object of the present invention to provide the use of a solid mineral composition comprising the following formula (I):

| | |
|---|---|
| Calcium carbonate | from 4.58% to 77.8% |
| Dolomite | from 3.85% to 69.29% |
| Sodium chloride | from 5.7% to 12.4% |
| Lignosulphate | from 4.25% to 8.49% |
| Potassium sulphate | from 0.37% to 2.44% |
| Magnesium oxide | from 0.01% to 0.07% |
| Elemental sulphur | from 0.009% to 0.066% | the above percentages consisting of the weight percentages of each of the compounds, relative to the total weight of dry matter of said mineral composition,
for increasing the fertility of a soil by causing an increase in at least one enzymatic activity contained in said soil, selected from (i) phosphatase, (ii) β-xylosidase, (iii) α-glucosidase and (iv) β-glucosidase.

DESCRIPTION OF THE FIGURES

FIG. 1 illustrates the results of enzymatic activity measurements for various soils. On FIGS. 1A to 1G are illustrated measurements of various enzymatic activities of a soil with a vegetal cover and earthworms, without the mineral composition of formula (I) (left bar) and with treatment using the mineral composition of formula (I) (right bar) respectively.

On the axis of ordinates, the enzymatic activity is expressed in Unit of activity per gram of dry soil and per hour.

FIG. 2A shows the correlation circle of the enzymatic activities measured.

FIG. 2B shows the object projections (the various microcosms) on axis 1 and axis 2 of FIG. 2A.

FIG. 10 illustrates the effect of the mineral composition of formula (I) on the vegetation biomass production. On the axis of ordinates: measurement of vegetation biomass production, expressed in grams of dry weight.

DETAILED DESCRIPTION OF THE INVENTION

Figure 1A:
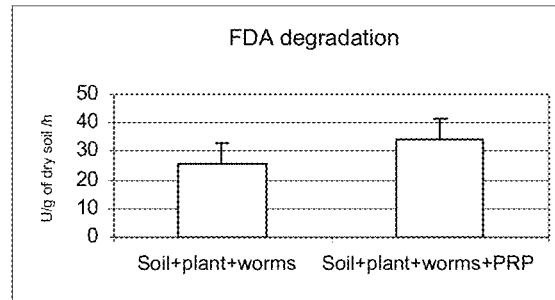
FIG. 1A illustrates the measurement of the global enzymatic activity.
Figure 1B:
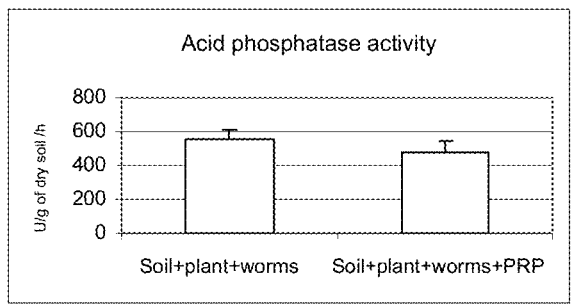
FIG. 1B illustrates the measurement of the acid phosphatase enzymatic activity.
Figure 1C:
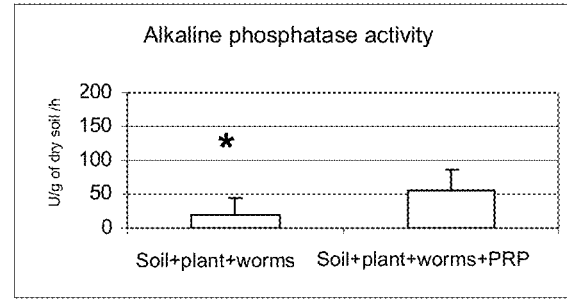
FIG. 1C illustrates the measurement of the alkaline phosphatase enzymatic activity.
Figure 1D:
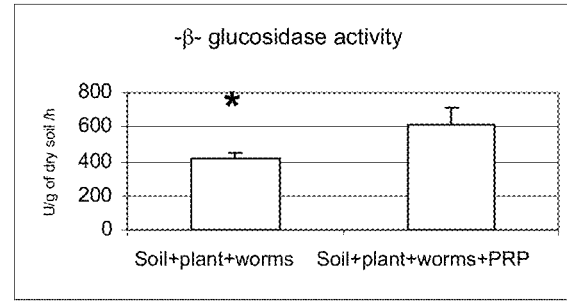
FIG. 1D illustrates the measurement of the β-glucosidase enzymatic activity.
Figure 1E:
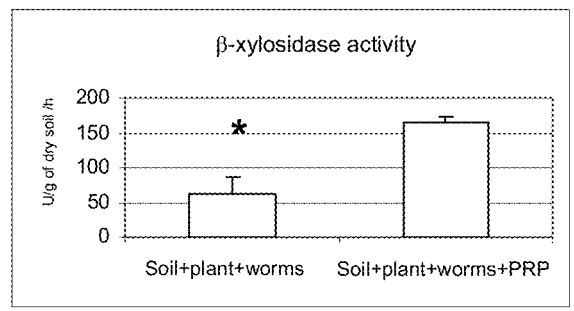
FIG. 1E illustrates the measurement of the 3-xylosidase enzymatic activity.
Figure 1F:
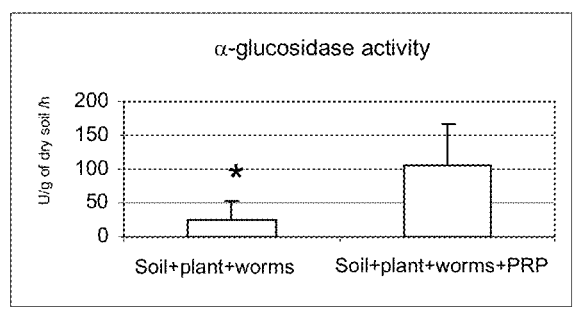
FIG. 1F illustrates the measurement of the α-glucosidase enzymatic activity.

It has been demonstrated according to the invention that adding a mineral composition that is specific to a soil leads to a substantial change in the enzymatic activity profile of said soil and increases its fertility.

In particular, it has been demonstrated according to the invention that adding said mineral composition that is specific to a soil leads to an increase in the activity of some enzymes such as phosphatase, β-xylosidase, α-glucosidase and β-glucosidase, which are known as being crucial for fertility properties.

Thus, the present invention relates to the use of a solid mineral composition comprising the following formula (I):

| | |
|---|---|
| Calcium carbonate | from 4.58% to 77.8% |
| Dolomite | from 3.85% to 69.29% |
| Sodium chloride | from 5.7% to 12.4% |
| Lignosulphate | from 4.25% to 8.49% |
| Potassium sulphate | from 0.37% to 2.44% |
| Magnesium oxide | from 0.01% to 0.07% |
| Elemental sulphur | from 0.009% to 0.066% | the above percentages consisting of the weight percentages of each of the compounds, relative to the total weight of dry matter of said mineral composition,
for increasing the fertility of a soil by causing an increase of at least one enzymatic activity contained in said soil, selected from (i) alkaline phosphatase, (ii) β-xylosidase, (iii) α-glucosidase and (iv) β-glucosidase.

Preferably, the above solid mineral composition further comprises a combination of one or more additional compounds selected from sodium bicarbonate, ferrous sulphate, manganous sulphate, zinc oxide, potassium iodide, copper sulphate and boric acid.

More preferably, the above one or more additional compounds are comprised in the mineral composition in following amounts:

from 0.007% to 0.158% of sodium bicarbonate,
from 0.0009% to 0.0434% of ferrous sulphate,
from 0.004% to 0.040% of manganous sulphate,
from 0.0006% to 0.0040% of zinc oxide,
from 0.0004% to 0.0032% of potassium iodide,
from 0.0002% to 0.0040% of copper sulphate, and
from 0.0006% to 0.0040% of boric acid, the above percentages consisting of the percentages by weight of each of the compounds, relative to the total weight of dry matter of said mineral composition.

A preferred mineral composition for use according to the invention has the following formulation:

45.78% of calcium carbonate,
38.49% of dolomite,
9.52% of sodium chloride,
5.66% of lignosulphate,
0.49% of potassium sulphate,
0.014 of magnesium oxide,
0.015% of elemental sulphur, and
suitable amounts of a compound or a combination of at least two compounds selected from sodium bicarbonate, ferrous sulphate, manganous sulphate, zinc oxide, potassium iodide, copper sulphate and boric acid, so that said mineral composition comprises 100% by weight of components, the above percentages consisting of the weight percentages of each of the compounds, relative to the total weight of the said mineral composition dry matter.

Preferably, for fertilizing a soil, the mineral composition of formula (I) should be added in an amount of at least 0.01 kg per $m^2$ up to 0.10 kg/$m^2$.

In a further aspect, the present invention also relates to a method for fertilizing a soil comprising at least one step during which the mineral composition of formula (I) is added to said soil in an amount of at least 0.02 to 0.04 kg per $m^2$.

As a rule, the mineral composition of formula (I), which is a solid composition which is advantageously in the form of aggregates, is added to the soil to be fertilized through simple dispersion above the soil to be treated.

Phosphatase, that catalyzes the hydrolysis of phosphoester bonds, causes inorganic phosphate to be released, which may be then used by plants as a metabolite. It is generally admitted that this enzyme plays a crucial role in phosphate metabolic cycles and has an influence on plant growth. Thus, the higher the phosphatase activity of a soil, in particular the higher alkaline phosphatase activity is, the stronger the ability of such soil to promote plant growth is, even if the inorganic phosphate content of said soil is reduced.

β-xylosidase, involved in the hydrolysis of xylan (hemicellulose) enables to provide the soil microflora with nutritive compounds which, once mineralized are assimilated by the plant. The β-xylosidase activity occurs during the last steps of xylan degradation, which is one of the main components of the vegetable cell wall and which is found in vegetable wastes contained in soils.

The β-glucosidase activity is considered as an indicator of the soil quality. The β-glucosidase activity, involved in the hydrolysis of cellulose, is important for the fertility properties of a soil because cellulose is quantitatively the most abundant compound found in soils. β-glucosidase plays an important role in soils because this enzyme is responsible for the hydrolysis of various β-glucosides that are present in vegetable wastes and found upon decomposition thereof in soils. The cellulose degradation is considered as one of the major processes occurring within the carbon cycle in the soil. The microbial decomposition of cellulose in the soil is a complex process involving at least three types of enzymes, respectively endo-β-1,4-glucanases, exo-β-1,4-glucanases and β-1,4-glucosidases. The β-1,4-glucosidase activity hydrolyzes cellulose degradation products, such as disaccharide (cellobiose), to glucose molecules that may be directly assimilated by the microorganisms in the soil. Thus, the decomposition of cellulose contained in soils can be total only in the presence of a β-glucosidase activity. The β-glucosidase activity is considered as an indicator of the turnover of the vegetation biomass.

The α-glucosidase activity hydrolyzes the oligosaccharides resulting from the degradation of starch present in vegetable wastes upon decomposition thereof in soils, by producing D-glucose as an end product, which may be directly assimilated by the microorganisms present in the soil.

As used herein, a "soil" is more particularly intended to mean a crop soil or a prairie soil.

Crop soils include cultivated soils which are used in all fields of plant agriculture, including horticulture, arboriculture and vineyard.

Prairie soils include non cultivated soils which are especially used to provide fresh or dried vegetable material for feeding, in particular livestock feeding.

On the whole, soils are typically composed of a combination of mineral elements and organic elements, comprising variable proportions of sand, clay(s), sludge(s), limestone of any size, humus, organic wastes, microorganisms, air and water.

As used herein, an "enzymatic activity" is intended to mean the catalytic activity of transformation of a given substrate compound to an end product resulting from the catalytic reaction.

The measurement of the enzymatic activities of the enzyme types (i) phosphatase, (ii) 3-xylosidase, (iii) α-glucosidase and β-glucosidase may be performed by means of any suitable method well known from the person skilled in the art.

Advantageously, a small sample of soil is suspended in a suitable volume of distilled water so as to obtain a crude extract which is then used for the specific enzymatic assays.

Enzymatic assays may be carried out in any conventional manner, by incubating a crude extract aliquot from the earth to be tested together with the enzymatic activity substrate for a given period of time, then, once the enzymatic reaction has stopped, by quantifying the catalytic reaction product, typically by spectrophotometer reading.

As an illustration, following substrates may be conveniently used:
  for the phosphatase activity: 4-nitrophenyl di- or tri-phosphate salt,
  for the β-glucosidase activity: 4-nitrophenyl β-D-glucopyranoside,
  for the β-xylosidase activity: 4-nitrophenyl β-xyloside, and
  for the α-glucosidase activity: 4-nitrophenyl α-glucoside.

For testing the N-acetyl-glucosaminidase activity, 4-nitrophenyl N-acetyl-β-D-glucosaminide may be used.

When the hereabove substrates are used, the quantification of the catalytic reaction end product is performed by spectrophotometry with determination of the optical density (O.D.) at wavelength of 405 nanometers.

It has been shown according to the invention that adding a mineral composition of formula (I) to a soil (i) having a vegetal cover and no earthworms or to a soil (ii) having a vegetal cover and earthworms, induces a significant increase of alkaline phosphatase activity. It has thus been shown that, by adding the mineral composition of formula (I) to the hereabove type of soil (i), the alkaline phosphatase activity reveals to be ten times higher as compared to the alkaline phosphatase activity determined for a type of soil (i) devoid of formula (I). With the hereabove type of soil (ii), the alkaline phosphatase activity is typically increased by a factor of at least two, as compared to the phosphatase activity determined for a type of soil (ii) having the same composition but devoid of the mineral composition of formula (I).

It has also been shown according to the invention that adding a mineral composition of formula (I) to a soil (i) having a vegetal cover and no earthworms, to a soil (ii) having a vegetal cover and earthworms or to a soil (iii) without any vegetal cover and with earthworms, induces a significant increase of the β-xylosidase activity. It has thus been shown that, by adding the mineral composition of formula (I) to the type of soil (i), the β-xylosidase activity reveals to be at least three times higher as compared to the β-xylosidase activity determined for a type of soil (i) having not been treated with the mineral composition of formula (I). It has further been shown that the β-xylosidase activity determined for a type of soil (ii) after addition of the mineral composition of formula (I) is at least 2 times as high as the β-xylosidase activity determined for a type of soil (ii) having not been treated with the mineral composition of formula (I). With the hereabove type of soil (iii), the β-xylosidase activity is typically increased by a factor of at least five, as compared to the β-xylosidase activity determined for a soil of type (iii) devoid of the mineral composition of formula (I).

It has also been shown according to the invention that adding a mineral composition of formula (I) to a soil (i) with a vegetal cover and without earthworms, (ii) to a soil with a vegetal cover and with earthworms or (iii) to a soil without any vegetal cover and with earthworms, induces a significant increase of the α-glucosidase activity that is four times higher, as compared to the α-glucosidase activity, determined for a type of soil (i), (ii), (iii) having not been treated with the mineral composition of formula (I).

It has also been shown according to the invention that adding a mineral composition of formula (I) to a soil (ii) having a vegetal cover and earthworms, induces a significant increase in the β-glucosidase activity that is at least one and a half times higher, as compared of the O-glucosidase activity, determined for a soil (ii) devoid of the mineral composition of formula (I).

Referring now to FIG. 2B, it has been shown according to the invention that the composition of formula (I) has a statistically significant effect on the increase in the hereabove defined enzymatic activities (i) to (iv), whatever the type of soil being treated.

Without wishing to be bound by any theory, the applicant thinks that the increase in the soil enzymatic potential which results from the addition of the composition of formula (I) enables to improve the mineralization telluric process of organic materials.

As described hereabove, the mineral composition of formula (I), from the enzymatic point of view, does mainly induce the increase in enzymatic activities that are said to be "mirror" as regards the quantitative ratio to the soil global enzymatic activity, such as β-xylosidase, α-glucosidase or alkaline phosphatase activities. One should however be reminded that the mineral composition of formula (I) also leads to the increase in enzymatic activities that are said to be "major", as regards their quantitative ratio to the soil global enzymatic activity, such as β-glucosidase.

Without wishing to be bound by any theory, the applicant thinks that the mineral composition of formula (I) causes a "rebalancing" of the soil enzymatic profile by increasing some enzymatic activities, without simultaneously leading to a significant decrease in the other enzymatic activities.

In addition, the results obtained according to the invention show that the effect of the composition of formula (I) on the enzymatic activities varies depending on the types of soil to which said formulation is added, which proves that the effect of this formulation on the enzymatic activities depends on the qualitative and/or quantitative composition as to living organisms, especially in terms of flora and fauna contained in the treated soil, including microorganisms, in particular bacterial and fungal microorganisms. These results show that the mineral composition of formula (I) has a stimulating effect on the soil biological activity.

As shown in the examples, increases which can be observed for each of the enzymatic activities (i) alkaline phosphatase, (ii) β-xylosidase, (iii) α-glucosidase and (iv) β-glucosidase in types of soil (i), (ii) and (iii) in the presence of the mineral composition of formula (I) does not mean that adding the composition of formula (I) induces a global increase in the enzymatic activities of the treated soils. Thus, it is shown that the global enzymatic activity of a soil treated with a mineral composition of formula (I) is substantially the same as the global enzymatic activity of the same soil that has not been treated with the mineral composition of formula (I).

The global enzymatic activity of a soil may be determined by quantifying the non specific degradation of the diacetate fluorescein substrate (FDA).

On the contrary, the improvement of the fertility properties of a soil treated with a composition of formula (I), as a result of the specific increase in the hereabove enzymatic activities (i) to (iv) is illustrated by the fact that adding a composition of formula (I) induces an increase in the production of above-ground and under-ground vegetation biomass by at least 1.5, as compared to the same soil that has not been treated with the composition of formula (I). Thus, it has been shown that adding a composition of formula (I) to a soil (i) having a vegetal cover and no earthworms induces an increase in the production of above-ground and under-ground vegetation biomass by at least 1.5, such as calculated based on the vegetation biomass dry weight after harvesting. It has also been shown that adding a composition of formula (I) to a soil (ii) having a vegetal cover and earthworms induces an at least two-fold increase in the production of above-ground and under-ground vegetation biomass, such as calculated based on the biomass dry weight after harvesting.

Generally speaking, the applicant observed that the improvement of the soil quality which is obtained by adding the mineral composition of formula (I) is illustrated through an increase in the above-ground and under-ground vegetation biomass for the culture of most plants that are said to be "for large-scale farming" and for legumes, but also in arboriculture and for vineyard.

In addition, it is shown in the examples that the mineral composition of formula (I) also leads to a change in the profile of the bacterial populations present in the soil.

A study of the bacterial population profiles by analyzing 16S ribosomal DNA using a DGGE method (Denaturating Gradient Gel Electrophoresis) revealed that adding a composition of formula (I), whatever the type of soil tested, resulted in (i) an increase in the relative abundance of some bacterial taxons, which was materialized on the electrophoresis gel through an increase in the relative color density of one or more migration bands and (ii) a decrease in the relative abundance of other bacterial taxons, which was materialized through a decrease in the relative color density of one or more other migration bands.

Thus, the results given in the examples show that the mineral composition of formula (I) causes substantial detectable changes in dominance ratios between the various bacterial taxons, as compared to soils that have not been treated with the mineral composition of formula (I).

As illustrated in the examples, when comparing the migration profiles of bands corresponding to the 16S rDNA fragments obtained through DGGE, it is shown that the mineral composition of formula (I) induces the most important changes in bacterial population profiles in soils which have a flora and fauna complex environment, in particular in soils which have a vegetal cover and/or earthworms, knowing that the effect of the composition of formula (I) increases with the complexity of the treated soil.

A study was also conducted by sequencing 16S rDNA fragments corresponding to some bands that were predominant in DGGE which are found respectively in each of the different soils of distinct biological complexity, not treated or treated with a mineral composition of formula (I). Then, based on the sequence data, the phylogenetic relationship of the corresponding main bacteria could be determined. Because many telluric bacteria could not be cultured and therefore could not be identified, the comparison between our sequences and published data could not always lead to a taxonomic identification. However, the results show that for a soil (i) comprising a vegetal cover without earthworms and for a soil (iii) without any vegetal cover and with earthworms, the mineral composition of formula (I) promotes the prevalence of bacterial populations related to bacteria of division TM7 which are found within the rhizosphere and in peat beds. Generally speaking, it emerges from the analysis after 16S rDNA sequencing that adding the mineral composition of formula (I) induces broad changes in the relative abundance of bacterial taxons, by promoting the development of some of them and by slowing down the development of others, including that of bacterial taxons which are predominantly present in a similar soil but not treated with the composition of formula (I). In every instances, the mineral composition of formula (I) causes changes to occur in the bacterial population profiles which extent is proportional to the soil biological complexity. As an illustration, more and more significant changes in the bacterial population profiles induced by the composition of formula (I) could be observed, when comparing a soil without any vegetal cover and without earthworms to a soil with a vegetal cover and with earthworms.

The results of the examples show therefore that the action of the mineral composition of formula (I) varies, both quantitatively and qualitatively, depending on the type of telluric environment, especially depending on the presence or on the absence of a vegetal cover, and/or depending on the presence or on the absence of earthworms.

Generally speaking, changes in enzymatic activity profiles and in bacterial population profiles resulting from the addition of a mineral composition of formula (I) represent indicators of increase in the fertility of a soil which is illustrated through the increase observed in the production of the above-ground and under-ground vegetation biomasses.

The present invention will be further illustrated by means of the following examples.

EXAMPLES

A. Materials and Methods of the Examples

A.1. Materials

The soil is an agricultural soil collected in the area of Tardenois (region Picardie, France) of the silty-clay type. Soil sampling was performed randomly. The soil was then dried at ambient temperature and thereafter screened on a sieve with a mesh size of 2 mm.

The plant used for making the soil vegetal cover is a lolium belonging to a commercially broadly marketed species. Lolium marketed by the Jardiland company (Logne, France) may be used.

The earthworms used for these experiments are anecic worms belonging to the *Nicodrilus qiardi* species (also called *Allolobophora terrestris* or *Aporrectodea terrestris*).

The mineral composition of formula (I) was added to the dose equivalent of 200 kg/ha in each earth test sample, except in the control earth samples.

A.2. Preparation of Control Earth Samples (Control Microcosms) and Test Samples (Test Microcosms).

The microcosms are plastic pots each containing 1 kg of dry earth. This one is rewetted to its capacity in the field.

In the interested pots, worms were added for a biomass of 6 g/kg of dry earth. One gram of lolium seed was used for seeding the interested pots.

Worms were added to the pots when the plantlets of lolium reached a height of approximately 5 cm.

The experiment comprised three repetitions (or series) each corresponding to 8 modalities i.e. a total amount of 24 microcosms.

These microcosms were placed at ambient temperature (from 20 to 23 C.° for 1.5 months. After this period of time, lolium (above-ground part and under-ground part-roots) was harvested and thereafter placed in an oven for measuring the dry weight thereof. For each pot, two soil sample batches were collected to carry out biochemical and molecular analyses.

A.3. Enzymatic Analyses

One gram of soil was resuspended in 5 mL distilled water at 4° C. This suspension was the crude extract for the enzymatic assays.

1. Heterosidase Assays (PNP)

Preparation of Reactants:

$Na_2CO_3$: 2 gr were dissolved in 100 mL distilled water.

Enzymatic substrate:

Solutions were prepared with 80 mg of substrate dissolved in 10 mL distilled water.

4-Nitrophenyl phosphate di(tri) Salt (PNP-phosphate). This substrate enables to show the activity of the enzymes phosphatases involved in the mineralization of organic phosphate.

4-Nitrophenyl β-D-glucopyranoside (PNP-β-glucoside). Hydrolyzing this substrate enables to dose the activity of β-glucosidase involved in the last steps of cellulose degradation.

4-Nitrophenyl N-acetyl-β-D-glucosaminide (PNP N-acetyl-β-D-glucosaminide). Chitin is a substrate that is extensively spread in soils and is derived from arthropod cuticles and belongs to the membrane composition of a plurality of fungi. The chitinase and N-acetyl-glucosaminidase-mediated degradation of this substrate was a preliminary step to releasing amino sugars involved in both the carbon and the nitrogen cycles.

4-Nitrophenyl β-xyloside, (PNP-β-D-xyloside), was hydrolyzed through the β-xylosidase involved in the last steps of xylan degradation, one of the major components of the vegetable cell wall.

4-Nitrophenyl α-glucoside (PNP-α-D-glucoside). The α-glucosidase which hydrolyzed this substrate is one of the enzymes involved in starch degradation.

These solutions were stored at 4° C. in smoked vials.

Phosphate buffer pH 5:24.3 mL, citric acid 0.1 M were combined with 25.7 mL $Na_2HPO_4$, $12H_2O$ (0.2 M).

Borate buffer pH 9: 10 mL HCl 0.1 M were combined with 90 mL sodium borate 0.1 M Buffer solutions were stored at 4° C.

Microplate Assays:

Assays were performed in microplates. For each enzyme (acid phosphatase, alkaline phosphatase, β-glucosidase, α-glucosidase and β-xylosidase) one blank, three control substrates, three control enzymes and three assays were carried out as follows.

Blank:—100 µl distilled water
    25 µl Mac Ilvain buffer pH 5 or 9 depending on the test enzyme.

Control substrate:—50 µl distilled water
    25 µl phosphate buffer pH 5 or borate buffer pH 9 for alkaline phosphatase
    50 µl PNP substrate Control enzyme:—50 µl distilled water
    25 µl Mc Ilvain buffer pH 5 or 9
    50 µl enzyme solution (earth)

Assay-50 µl PNP substrate
    25 µl Mc Ilvain buffer pH 5 or 9
    50 µl enzyme solution (earth)

This assay was performed in a first conically tapered bottom-plate, which was incubated for 2 h in an oven at 37° C. under stirring.

After incubation 75 µl $NA_2CO_3$ 2% were added to each well.

The microplate was then centrifuged at 2500 rpm for 10 min. For each well, 50 µl of supernatant were transferred into a second plate which wells contained 250 µl $NA_2CO_3$ 2%. After manual stirring, the microplate was read with the spectrophotometer at 405 nm and compared to the blank.

Starting from a standard range that was determined beforehand, the relation between OD and phenol amount was given by the following formula:

$$X(\mu g\ phenol) = calculated\ OD \times 1.14,$$

where calculated OD=OD assay−(OD control substrate+OD control enzyme)

The enzymatic activity was defined as released phenol amount /gr of soil/h.

2. Microbial Activity Assay Using FDA (Fluorescein Diacetate)

Preparation of Reactants

FDA: 0.3 g FDA dissolved in 10 mL acetone were aliquoted into glass vials with 1 mL per vial. This solution stored at −20° C. was the stock solution.

This stock solution was diluted extemporaneously at 1:10 prior to carrying out the assays.

Phosphate buffer pH 7: 6.5 mL citric acid 0.1 M+43.6 mL $Na_2HPO_4$, $12H_2O$ (0.2 M).

Microplate Assays

Assays were performed in microplates. For each dosage one blank, three control substrates, three control enzymes and three assays were carried out as follows.

Blank:—150 µl $H_2O$
  50 µl phosphate buffer pH 7
Control enzyme:—50 µl $H_2O$
  50 µl Mac Ilvain buffer pH 7
  100 µl soil
Control substrate:—100 µl $H_2O$
  50 µl Mac Ilvain buffer pH 7
  50 µl FDA (dilute solution)
Assay:—100 µl soil
  50 µl Mac Ilvain buffer pH 7
  50 µl FDA The microplate was placed in an oven at 37° C. for 2 hours. It was then centrifuged for 10 minutes at 2500 rpm.

A volume of 100 µl of the supernatant of each well was transferred into the wells of a second round bottom plate, filled beforehand with 100 µl frozen Mac Ilvain ice buffer pH 7 (4° C.). Plate reading by means of the spectrophotometer was performed at 490 nm wavelength as compared to the blank.

For FDA, the enzymatic activity was expressed as fluorescein amount/gr of soil/h.

Determining a standard range made it possible to establish the relation between OD and fluorescein amount (µg) based on following formula:

$$X(\mu g\ of\ fluorescein) = calculated\ OD * 0.086$$

3. Molecular Analyses

For sequencing 16S ribosomal DNA genes specific to predominant and/or interesting bacterial populations with the various treatments applied to soil, DNA was re-extracted from soil samples contained in alcohol.

3.1. Soil DNA Extraction

The method selected for extracting DNA from soil relied on the use of a CTAB buffer (Cetyl-Trimethyl-Ammonium Bromide). 500 mg of each of 24 soil samples (8 modalities: S, S+P, S+M, S+V, S+V+P, S+P+M, S+V+M, S+V+M+P×3 repetitions) were collected and combined with 1000 µL extraction buffer CTAB, into tubes containing ceramic, silica and glass beads (Lysing Matrix E, MP Biomedicals). Cell lysis was performed by means of a homogenizer of the Fast-Prep-24 type (MP Biomedicals) for 45 s at 6.5 m/s. The samples were then incubated in a water bath at 65° C. for 1 hour. Extraction and purification of nucleic acids were performed using phenol Chloroform Isoamyl (24:24:1) and Chloroform Isoamyl (24:1), associated with Phase Lock Gel Tubes (VWR). DNA was then precipitated using PEG (Poly-Ethylene Glycol), pellets were washed with ethanol 70° and taken up in 50 µL buffer EB (Tris HCl). Extracted DNA for the 3 repetitions was combined for each of the 8 modalities, so as to provide DNA in a sufficient amount for the subsequent reactions. DNA was thus quantified and the purity thereof evaluated (absence of humic acid, of proteins) using a spectrophotometer (Nanodrop).

3.2. PCR Amplification of Bacterial 16S rDNA Fragments

PCRs (Polymerase Chain Reactions) were carried out by using a thermocycler of the TC-3000 type (Techne) with universal bacterial primers. For each of the reactions are added 0.25 µM of each primer, 10 µL of PCR buffer 10×, 1.5 mM $MgCl_2$, 0.2 mM dNTPs (deoxyNucleoside TriPhosphates), 6U Taq Polymerase (Invitrogen), 15-80 ng DNA matrix and sterile water up to a final volume of 100 µL. Primers used for PCR were 518r (5'-ATT ACC GCG GCT GCT GG-3'-SEQ ID NO 1) and GC-338f (5'-CGC CCG CCG CGC GCG GCG GGC GGG GCG GGG GCA CGG GGG GAC TCC TAC GGG AGG CAG CAG-3'-SEQ ID NO 2) and did precisely amplify the variable region V3 of 16S ribosomal DNA maintained in bacteria (around 200 pb). The GC-rich sequence (GC-clamp) attached to the 5' end of primer GC-338f impeded the complete DNA double strand denaturation during the separation of the PCR fragments through DGGE. PCR amplification started with an initial denaturation at 94° C. for 5 minutes, followed with 32 cycles of 1) denaturation at 94° C. for 30 s, 2) hybridization at 54° C. for 45 s and 3) extension at 72° C. for 1.5 hours. It ended with a final extension at 72° C. for 20 min.

3.3. Visualization and Quantization of PCR Products

PCR products were deposited onto 2% agarose gel stained with SYBR Safe (Invitrogen) at a concentration 1×. PCR fragments were visualized on UV plates and quantified using a quantitative size marker, of the SmartLadder type (Eurogentec).

3.4. DGGE

A DGGE assay (Denaturing Gradient Polyacrylamide Gel Electrophoresis) was carried out on a DCode Universal Mutation Detection system (Bio-Rad). The PCR product samples (100 µL, i.e. around 500 ng) were loaded on a 8% polyacrylamide gel in TAE 0.5×(Tris-acetic acid-EDTA). To obtain a polyacrylamide gel with a linear denaturation gradient of 30-70%, 11.2 mL of a solution 0% (acrylamide 20 mL, TAE 50×2 mL and $H_2O$ q.s. 100 mL) and 4.8 mL of a solution 100% (acrylamide 20 mL, TAE 50×2 mL, formamide 40 mL, urea 42 g and $H_2O$ q.s. 100 mL) were combined for obtaining the Low solution (30%). In the same way, 4.8 mL of the solution 0% and 11.2 mL of the solution 100% were combined for obtaining the High solution (70%). Electrophoresis was performed at 60° C. for 16H at 75V. After the migration, the gel was revealed in an ethidium bromide bath and a picture was taken under U.V. The interesting bands were cut out and collected using a scalpel.

3.5. Sequencing the Interesting Bands

DNA contained in the bands was individually eluted by allowing the cut out bands standing overnight at 4° C. in 50 μL ultra-pure water. 2 μL of the eluate were used for re-amplifying the bands individually through PCR according to the previously described protocol. To check for the presence of a single band in each of the PCR products, PCR products had been deposited onto a DDGE gel (gradient 30-50%) close to the original sample. The procedure was repeated until a single band was obtained for each PCR product. Pure PCR products were then transmitted for sequencing (Gexbyweb, Genome Express).

A.4. Statistic Analyses of the DGGE Migration Band Profiles

1. Graphic and Statistic Analyses of the Profiles

The gel image was recovered and analyzed by means of the Quantity One software v4.6.5 (Biorad), making it possible to automatically detect bands on the DGGE profile. A binary matrix representative of the profile bands was implemented as follows: the presence of a band was coded '1', the absence thereof was coded '0', as related to the bands that could be detected in all samples of a same gel. Based on this binary matrix, a distance matrix was generated by using a similarity coefficient. Dice's coefficient was used here ($S_{Dice}=2N_{AB}/(N_A+N_B)$ where NA and $N_B$ respectively represent the number of bands in samples A and B, and $N_{AB}$, the number of common bands). The distance matrix was then analyzed using the UPGMA grouping (Unweighted Pairwise Grouping with Mathematical Average) and Neighbor Joining methods, making it possible to infer therefrom a dendrogram graphically describing the distances between all the different samples.

2. Molecular and Phylogenetic Analyses of the Sequences

Chromatograms of the sequences were recovered and visualized with the Chromas LITE software version 2.01, also enabling a manual correction of the sequences. Sequences were compared to all the sequences available in the NCBI data banks through BLAST analysis, which returned the sequences with the highest identity scores as compared to the tested sequences. An additional taxonomic assignment analysis was performed using the Ribosomal Database Project II Classifier.

The sequences obtained were then aligned with 47 sequences representative of the bacteria of division TM7, 2 sequences TM6, 2 sequences of Group I Termite, and 2 sequences of green nonsulfur bacteria available from NCBI databases, using the CLUSTALW software. Alignment (140 pb) was corrected manually with the SEAVIEW program. A Neighbor Joining tree was finally generated using the MEGA4 software, with 1000 bootstrap repetitions.

B. Results

Example 1

Effect of the Composition of Formula (I) on the Soil Enzymatic Activities

Figure 1G:
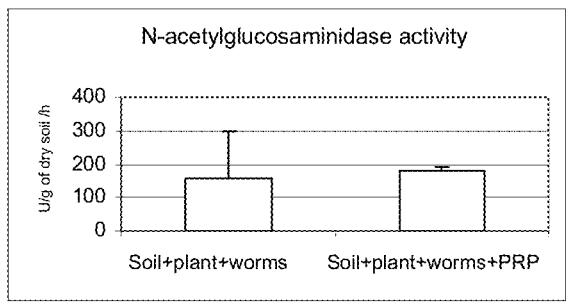
FIG. 1G illustrates the measurement of the N-acetyl-glucosaminidase enzymatic activity.

The whole results of the enzymatic activity measurements are given on FIG. 1, respectively for: the global enzymatic activity (FIG. 1A), the acid phosphatase activity (FIG. 1B), the alkaline phosphatase activity (FIG. 1C), the β-glucosidase activity (FIG. 1D), the β-xylosidase activity (FIG. 1E), the α-glucosidase activity (FIG. 1F) and the N-acetyl-glucosaminidase activity (FIG. 1G).

1.A/ In the Presence of Soil

Whatever the enzyme tested, no significant increase could be evidenced between soils without any vegetal cover and without earthworms, treated or not with the mineral composition of formula (I). Likewise, no detrimental effect could be detected.

1.B/ In the Presence of Soil and Lolium

FDA degradation was not affected by the presence of the mineral composition of formula (I). The activities of the acid phosphatase, β-glucosidase and N-acetyl-glucosaminidase in the presence of the mineral composition of formula (I) were higher than those measured in controls. However, because of the variability, the differences observed were not significant at risk a of 5%. On the contrary, the activities of the alkaline phosphatase, β-xylosidase and α-glucosidase are significantly increased by multiplication factors of 10, 4 and 4, respectively.

These results show that in the presence of a vegetal cover:

1°/ there is an effect of the mineral composition of formula (I) on the soil enzymatic activity 2°/ this effect applies to enzymes which are minor in terms of intensity.

1.C/ In the Presence of a Soil and Earthworms

When the mineral composition of formula (I) is added to a soil in the presence of worms (lumbricus), two enzymes have a significant increase in their activity. These enzymes are β-xylosidase, the activity of which is multiplied by 6 and α-glucosidase which from a control activity of 25 turns to 112 Ug of soil $sec^{-1} h^{-1}$. The activities of the other tested enzymes did not change.

1.D/ In the Presence of Earthworms and Lolium

In the presence of earthworms and lolium, the mineral composition of formula (I) enables to increase the alkaline phosphatase activity by a factor of 3, the β-glucosidase activity by a factor of 1.5, the β-xylosidase activity by a factor of 2.5 and the α-glucosidase activity by a factor of 4.

1.E/ Major Component Analysis

This analysis aims at statistically validating the presence of an effect of the mineral composition of formula (I) on the soil enzymatic activities depending on the various tested modalities (presence of plants and/or of earthworms . . . ).

The correlation circle illustrated on FIG. 2A shows that axis 1 representing 35% of total variance is defined by the alkaline phosphatase, α-glucosidase, β-xylosidase activities and by the FDA degradation. Axis 2, corresponding to 21% of variance, is in turn defined by the acid phosphatase, N-acetyl-glucosaminidase and β-glucosidase activities.

As illustrated on FIG. 2B, the object projection on both axes shows a clear opposition between treatments with the mineral composition of formula (I) and the various controls. Therefore there is indeed an effect of the composition of formula (I) on the soil enzymatic profile tested.

The results of the enzymatic activity measurements represented on FIGS. 1A to 1G are described more precisely in Table 1 at the end of the present description.

In Table 1:

"S" is intended to mean a soil without any vegetal cover and without earthworms, "S+M" is intended to mean the soil "S" treated with the mineral composition of formula (I), "S+V" is intended to mean a soil without any vegetal cover and with earthworms, "S+V+M" is intended to mean a soil "S+V" treated with the mineral composition of formula (I), "S+P" is intended to mean a soil with a vegetal cover and without earthworms, "S+P+M" is intended to mean a soil "S+P" treated with the mineral composition of formula (I), "S+V+P" is intended to mean a soil with a vegetal cover and with earthworms, and "S+V+P+M" is intended to mean a soil "S+V+P" treated with a mineral composition of formula (I).

This study made it possible to experimentally demonstrate that adding the mineral composition of formula (I) enables to significantly increase the production of vegetation biomass.

It has also been shown that adding the mineral composition of formula (I) for increasing the soil enzymatic potential to optimize the mineralization process of the organic material could also be confirmed as proven through the major component analysis. However, the results obtained show that the beneficial effect of the mineral composition of formula (I) depends on 1°/ The Enzyme Considered.

Thus the two major activities, that is to say that of acid phosphatase and β-glucosidase which characterize this soil are not the enzymes that are most influenced by the mineral composition of formula (I). Indeed, such beneficial effect could be observed for "minor" enzymes (not as regards their role in the soil performance but as regards their activity level) such as β-xylosidase, α-glucosidase or alkaline phosphatase. This means that the mineral composition of formula (I) makes it possible to "re-balance" the soil enzymatic profile without causing any decrease in the other activities.

2°/the Modalities Prevailing.

Indeed, depending on the tested modality (presence or absence of lolium/night crawler) the results obtained are distinct. The effect of the mineral composition of formula (I) therefore depends on the living organisms (plants/animals). This result strongly suggests that the mineral composition of formula (I) acts as a catalyst stimulating some biological activities of the soil.

Evidencing a change in the soil enzymatic profiles, especially in the saccharide agro-polymer pathways due to the mineral composition of formula (I) raises the question whether this change is dictated by a change in the microbial communities. This is the object of example 2 hereunder.

Example 2

Effect of the Mineral Composition of Formula (I) on the Soil Bacterial Populations DGGE analyses of the PCR-amplified 16S rRNA gene fragments, obtained for the 8 microcosms were compared for visualizing the changes in the genetic diversity of the bacterial communities, following the various treatments. The visual inspection of the DGGE profiles reveals that the number of bacterial populations is not substantially changed as a result of the treatments applied to soil. By contrast, prevalent microbial populations seem to be very different depending on the treatments applied to soil.

A/ Impact of the PRP Mineral Solution in the Presence of Soil Alone

Figure 3:
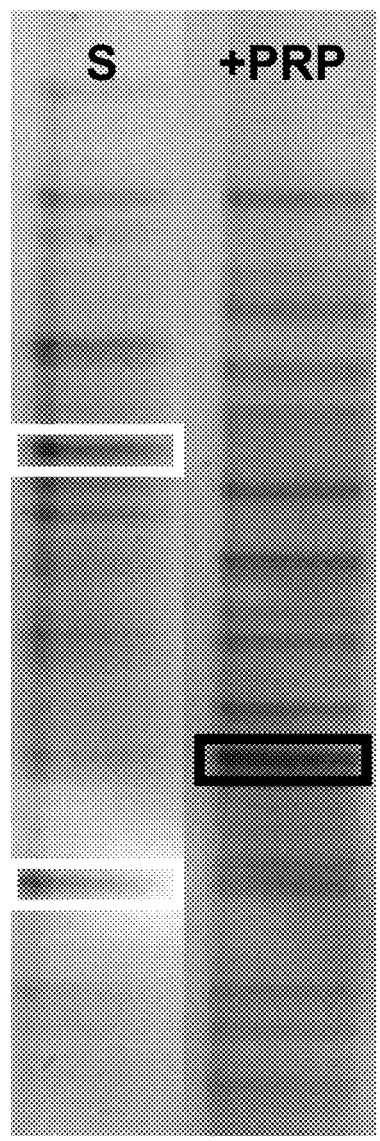
FIG. 3 shows a picture of a denaturing gradient electrophoresis gel (DGGE). Left track: a soil without any vegetal cover and without earthworms. Right track: the same soil treated with the mineral composition of formula (I).

The results are represented on FIG. 3

Adding the mineral composition of formula (I) cause changes to occur within the structure of the bacterial communities as compared to soil alone (profile S). Predominant populations in the soil alone (in red) are no more prevalent in the soil with the composition (I) added (bands disappear or become lighter). However, the disappearance/reduction in intensity of the bands should not always be interpreted as the loss of concerned taxons. Indeed, it may just reflect the change in the relative density amongst the populations, where the increase in some populations may cause others to fall under the DGGE detection threshold. In the soil where composition (I) was added, a bacterial population is predominantly represented (in green), although already present in the soil alone. This may suggest either a development of this population in the presence of composition (I), or a regulation of the populations which were prevalent in the soil alone. This last hypothesis would be confirmed by the fact that the profile is more homogenous, as regards the band intensity, for the sample of soil treated with composition (I) which would therefore act as a modulator.

B/ Impact of the PRP Mineral Formulation in the Presence of Lolium

Figure 4:
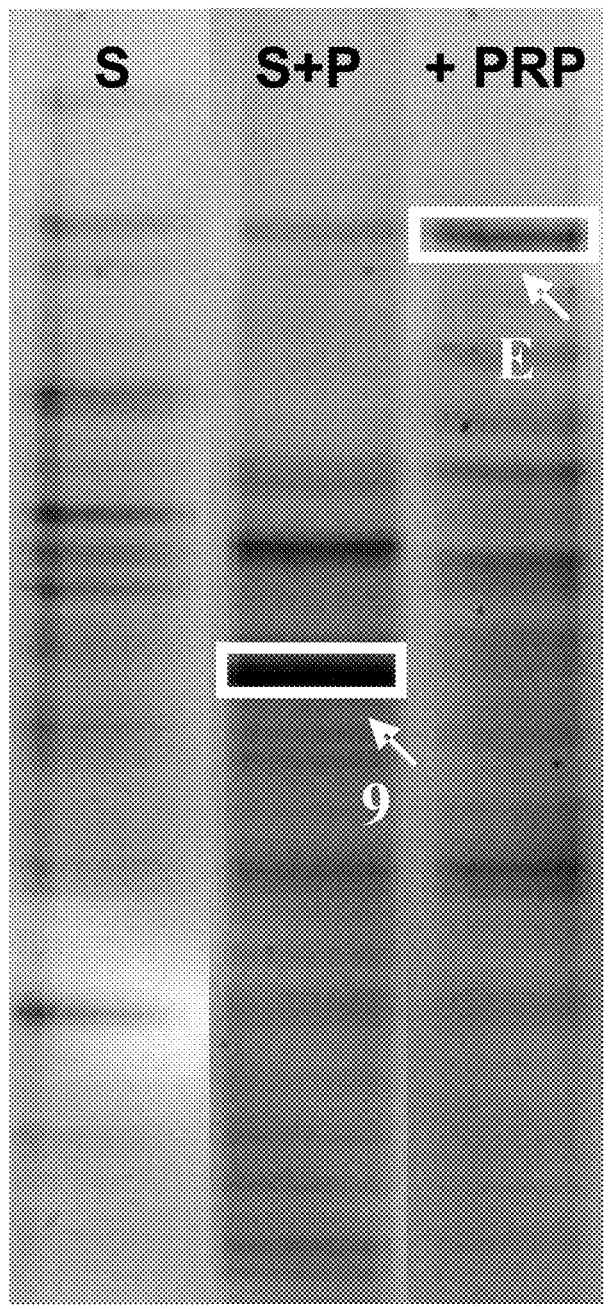
FIG. 4 shows a picture of a denaturing gradient electrophoresis gel (DGGE). Left track: a soil without any vegetal cover and without earthworms. Median track: a soil with a vegetal cover without earthworms. Right track: the same soil with a vegetal cover without earthworms, treated with the mineral composition of formula (I).

The results are represented on FIG. 4.

In the presence of lolium (profile S+P), the structure of the bacterial communities is strongly changed as compared to the soil alone. Amongst the predominant populations, a highly prevalent population (band 9) can be observed which was not detected in the soil alone.

By adding the composition (I) in the presence of lolium, these predominant populations cannot be observed anymore. Band E, which appears to be the most intense in this profile corresponds to a population which either may have been activated in the presence of the composition (I), or which became prevalent as a result of the regulation of those populations which were prevalent in the presence of lolium only.

Here again, it appears therefore indisputably that the composition (I) acts as a modulator on the bacterial communities present in the soil.

C/ Impact of the PRP Mineral Formulation in the Presence of Earthworms

Figure 5:
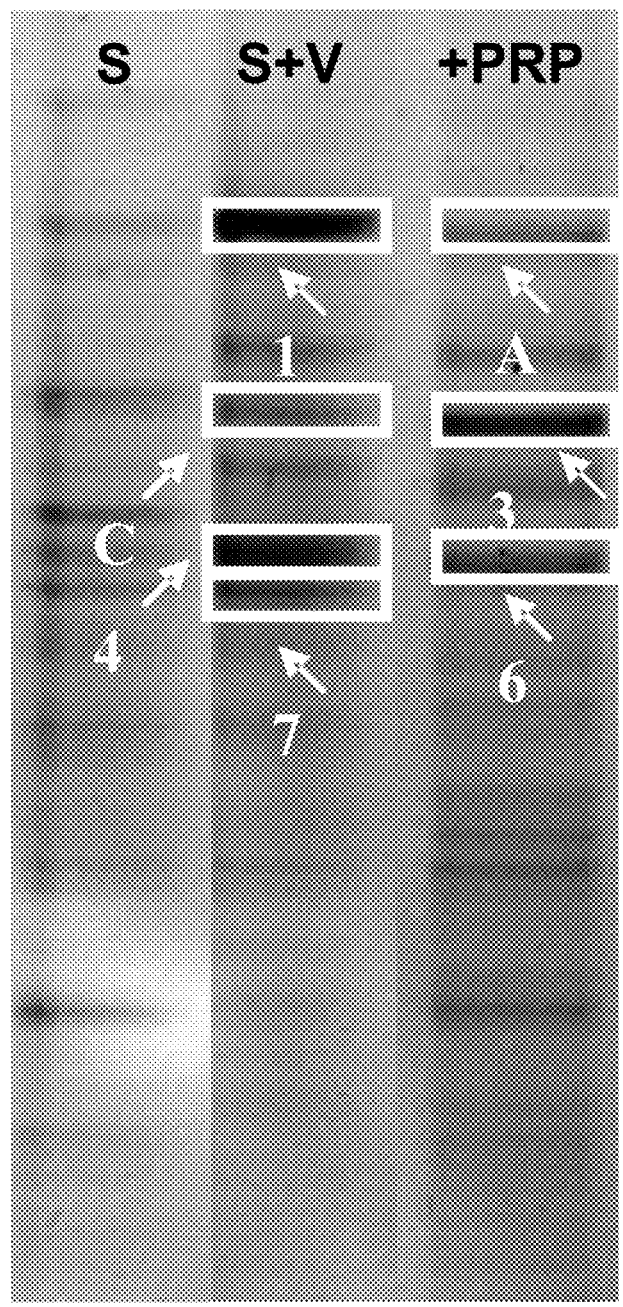
FIG. 5 shows a picture of a denaturing gradient electrophoresis gel (DGGE). Left track: a soil without any vegetal cover and without earthworms. Median track: a soil without any vegetal cover and with earthworms. Right track: the same soil without any vegetal cover and with earthworms, treated with the mineral composition of formula (I).

The results are represented on FIG. 5.

In the presence of earthworms (profile S+V), the bacterial communities present in the soil seem also to be reengineered. Although a great number of bands are common, the relative proportion of the populations is deeply modified. To be mentioned in particular is the presence of three predominant populations in the presence of earthworms (bands 1, 4 and 7).

Adding the composition (I) in the presence of worms results in a still distinct structure amongst the communities. If populations that are common to profile S+V are indeed observed, their relative proportion seems to be changed. Indeed, populations corresponding to the bands A and 6 are less prevalent, and on the contrary the population corresponding to band 3 becomes predominant in the presence of the composition (I). This band 3 does not correspond to the band C detected on profile S+V (see the sequences).

Although intense bands exist, and therefore predominant groups, it could be observed on the whole profile in the presence of the composition (I) that the PRP effect does express as a higher diversity of microbial populations, with relatively homogenous densities. In that case again a modulating effect of the composition (I) can be observed even in the presence of earthworms.

Figure 6:
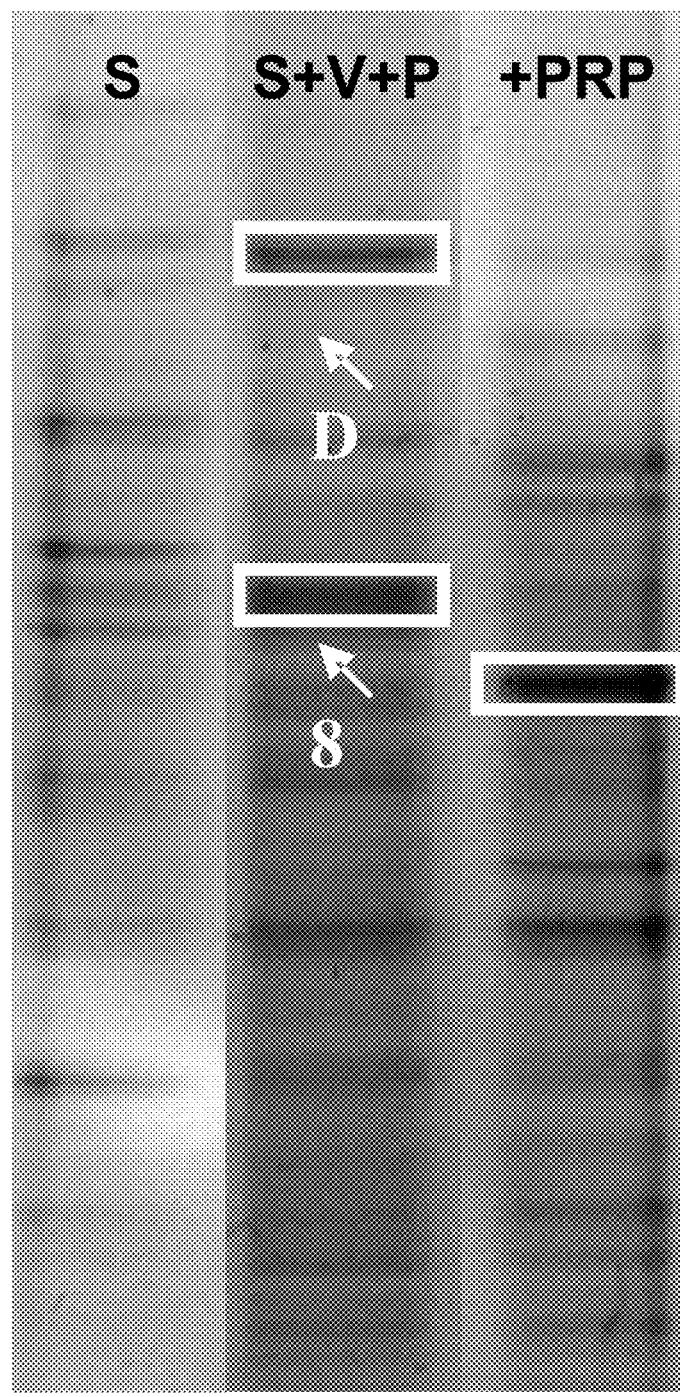
FIG. 6 shows a picture of a denaturing gradient electrophoresis gel (DGGE). Left track: a soil without any vegetal cover and without earthworms. Median track: a soil with a vegetal cover and with earthworms. Right track: the same soil with a vegetal cover and earthworms, treated with the mineral composition of formula (I).

D/ Impact of the PRP Mineral Formulation in the Presence of Lolium and Earthworms The results are represented on FIG. 6.

The combination lolium plus worms (profile S+V+P) has a substantial impact on the bacterial communities as compared to the soil alone (profile S). The populations corresponding to the bands D and 8 become prevalent. The other predominant population in the worms/lolium combination corresponds to the band 8.

Adding the composition (I) in the presence of lolium and of worms deeply modifies the bacterial communities. The populations corresponding to the bands D and 8 are not prevalent anymore and another population (in green, sequence not obtained) seems to be directly activated through the composition (I) or to benefit from the regulation effected on the other populations. In this case, the modulating effect of the composition (I) observed for the other modalities is less marked.

Example 3

Figure 7:
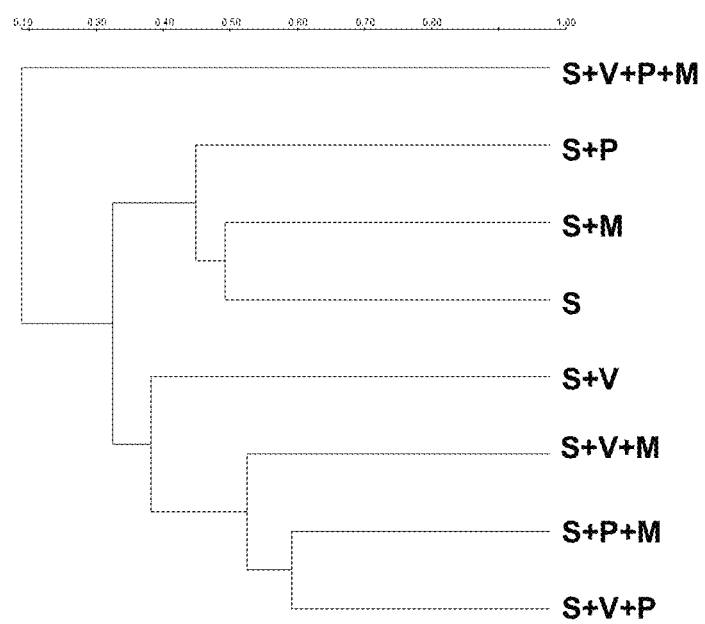
FIG. 7 shows a dendrogram illustrating the similarities between the profiles of bacteria populations found in the various soils tested, based on the DGGE migration band profiles shown on FIGS. 3 to 6.

Specificity of the Effect of the Mineral Composition of Formula (I) on the Bacterial Predominant Populations A similarity study between the various treatments was carried out by taking into account both the presence of bands (therefore the presence of bacterial communities) and the intensity thereof (FIG. 7).

This analysis could comprise two scenarios:

1°/the effect of the composition (I) is less marked. In this case the bacterial profile of a soil with no composition (I) should have a high similarity with the bacterial profile of the same soil treated with the composition (I). On the similarity dendrogram illustrated on FIG. 7, these two modalities are then brought together or not far from each other.

2°/the effect of the composition (I) is Very significant, and in this case, the bacterial profiles of the soils treated with the composition (I) have a low similarity coefficient compared to the bacterial profiles of the same, non treated soils. Their respective positions on the dendrogram are then relatively distant from each other.

The analysis graphically represented on FIG. 7 shows that the soil (S) and the soil alone treated with the composition (I) (S+M) are present in a same cluster level. This means that the composition (I) on a soil with neither night crawler nor plant has a relatively moderate effect as compared to the other tested treatments.

On the contrary, the effect of the composition (I) is very clear with the soil comprising earthworms and lolium (S+V+P+M) since this treatment is very different from the other treatment, especially from the treatment comprising worms/plant with no composition (I) (S+V+P). This could be also observed for the soil comprising lolium (S+P) since the latter is relatively different from the soil with lolium and the composition (I) (S+P+M). For the soil comprising earthworms (S+V), as compared to the soil with earthworms and the composition (I) (S+V+M), the effect although undeniable is however less marked.

Example 4

Figure 8:
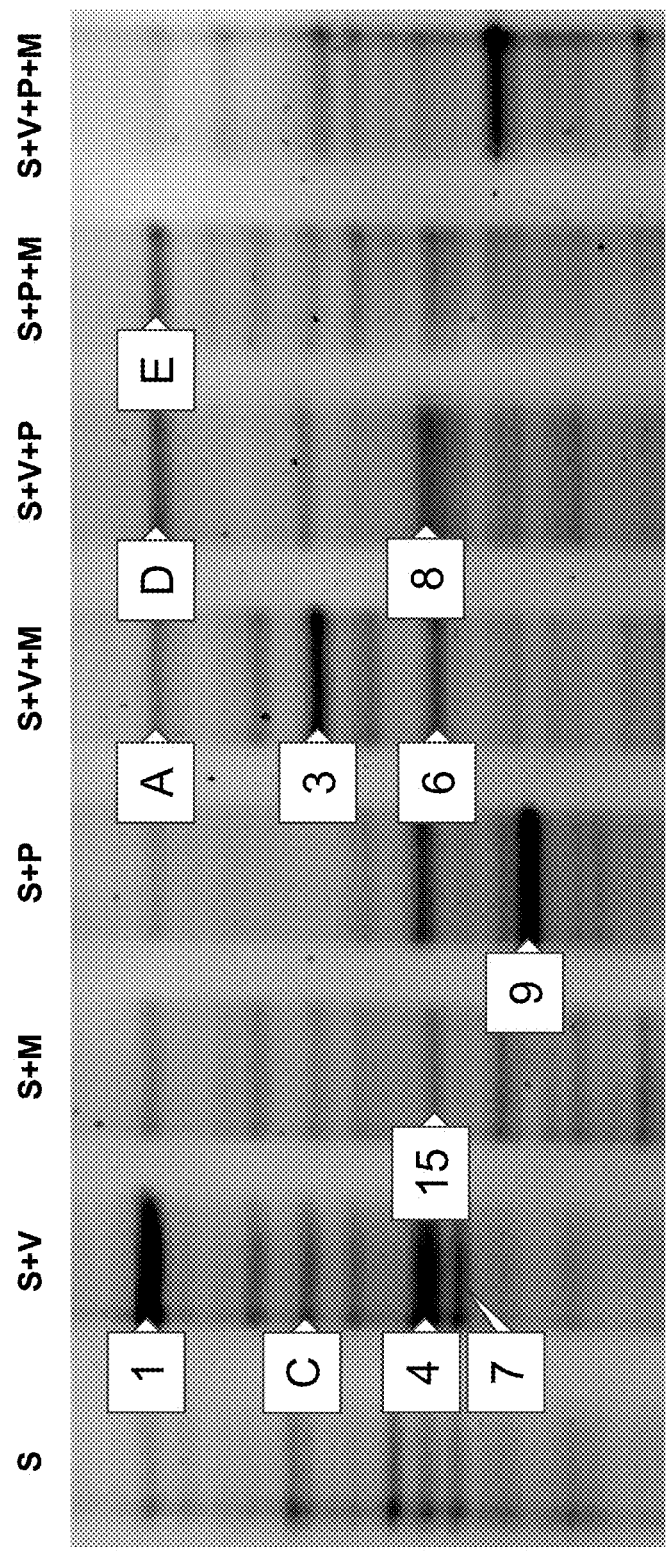
FIG. 8 shows a picture of a denaturing gradient electrophoresis gel (DGGE). Track "S": a soil without any vegetal cover and without earthworms. Track "S+V": a soil "S" without any vegetal cover and with earthworms. Track "S+M": a soil "S" treated with the mineral composition of formula (I). Track "S+P": a soil "S" with a vegetal cover and without earthworms. Track "S+V+M": a soil "S+V" treated with the mineral composition of formula (I). Track "S+V+P": a soil "S" with a vegetal cover and with earthworms. Track "S+P+M": a soil "S+P" treated with the mineral composition of formula (I). Track "S+V+P+M": a soil "S+V+P" treated with the mineral composition of formula (I).
Figure 9:
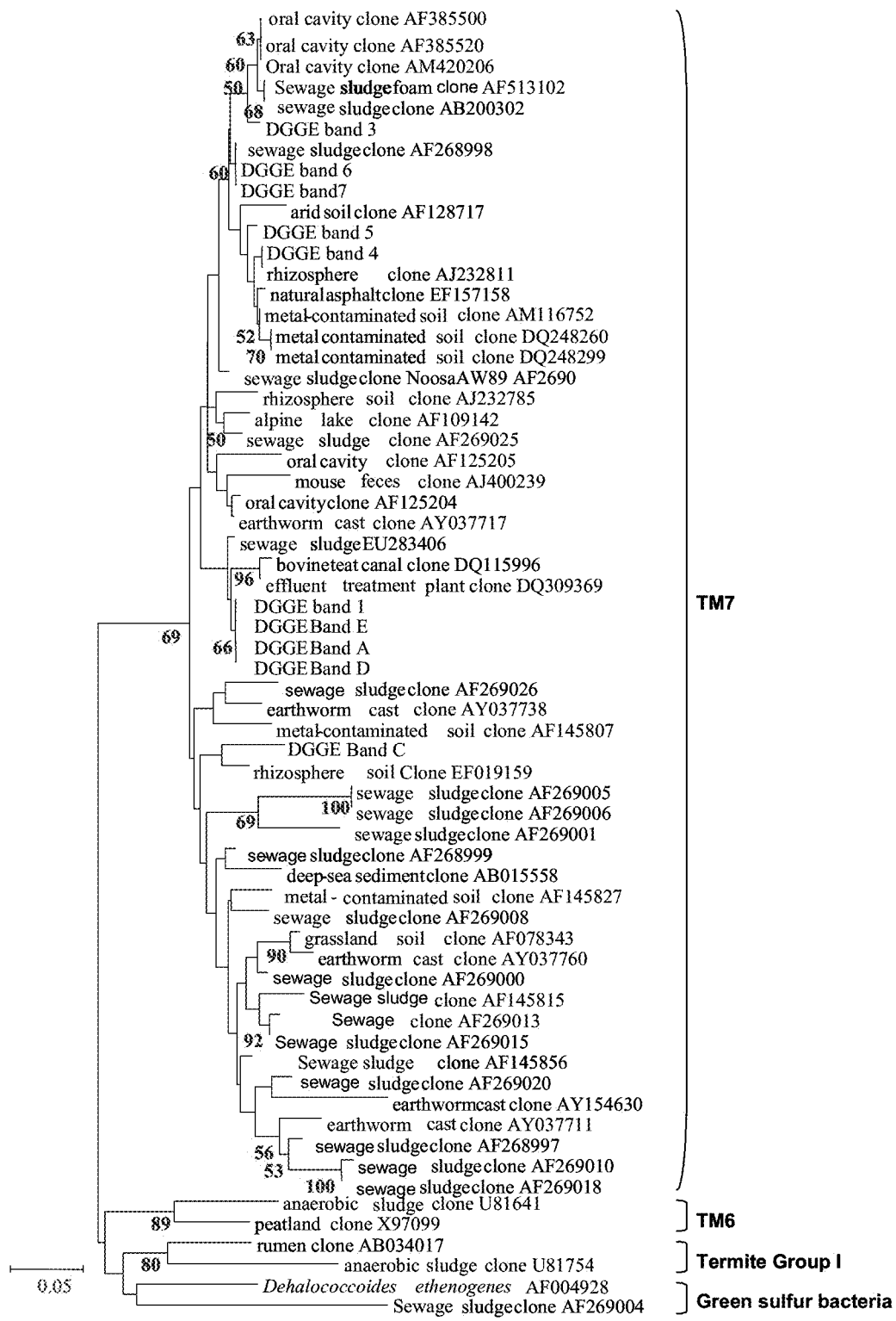
FIG. 9 shows a phylogenetic reconstruction of division TM7 based on 16S rDNA, using the Neighbor Joining method, including bacterial groups sequenced from some DGGE gel migration bands illustrated on FIG. 8 and sequences returned from data banks.

Identification Assay Through Sequencing of 16S rDNA Fragments Corresponding to the Bacterial Predominant Populations A/ DGGE Gel Used for Sequencing DGGE gel presented on FIG. 8 shows the various bands that were collected, purified and thereafter sequenced. These bands have been chosen because of their high profile relative intensity. It should be noted that some prevalent bands could not be sequenced due to too many difficulties for purifying them.

B/ Comparing the Well Sequences for Soil (S)/Soil+PRP (S+M)

In the soil to which the composition (I) (S+M) was added, one bacterial population is in majority represented (band 15). BLAST Analysis compares the sequence of this group with that of a non cultivable bacterial taxon, therefore with a morphologically non identifiable structure (Access number Genbank: EF 157158. identity percentage: 97%). According to RDPII Classifier (can be found at following Internet address: <<http://rdp.cme.msu.edu/classifier/classifier">), such population can be related to bacteria division TM7 with an assignment rate of 91%. This division, that has been recently described, has members which are widely spread within the environment. In soil, bacteria of division TM7 could thus be evidenced in the rhizosphere and in peat beds.

C/ Comparing the Well Sequences for Soil+Lolium (S+P)/Soil+Lolium+PRP(S+P+M)

Sequencing the 16S rDNA of band 9 did not allow to identify this population very highly dominant in the soil with lolium. Indeed, the most comparable sequence according to BLAST analysis (access number Genbank EU134275: 99% identity) corresponds to an unidentified bacterial clone, derived from the prairie soil (see Table 2 hereunder).

By adding the composition (I) in the presence of lolium, band E seems to be the most intense. 16S rDNA sequencing indicates that the comparatively nearest sequence corresponds to access number EU283406 (98% identity, population derived from an activated sludge) (see Table 2 at the end of the present description). According to RDPII Classifier, this population is related to bacteria division TM7 with an assignment rate of 97%.

D/ Comparing the Well Sequences for Soil+Worms (S+V)/Soil+Worms+PRP(S+V+M)

As regards the soil with worms (S+V), a molecular analysis and the taxonomic assignment showed that the three populations (bands 1, 4, 7) are related to bacteria division TM7 (respective comparatively nearest sequences: AN EU283406, 98% identity; AN AJ232811, 99% identity and AN AF269024, 99% identity) (Table 2). The phylogenetic analysis (FIG. 2) confirms such classification. Although having an affinity for sequence DQ 828869 (98% identity) derived from an agricultural soil, population C could not be associated with an identified bacterial group until now.

In the case of worms+the composition (I) (S+V+M), populations that are common to profile S+V are revealed, but their relative proportion seems to be changed. Indeed, for example, the population corresponding to band A (idem 1, division TM7) is less dominant in the presence of the PRP mineral formulation. On the other hand, while the populations corresponding to bands 1, 4 and 7 were markedly prevalent in profile S+E, the dominant populations in profile (S+E+M) are those corresponding to bands 6 (comparatively nearest sequence: AN AF269024, 99%, division TM7) and 3 (comparatively nearest sequence: AN AY820689, 99% identity, division TM7).

E/ Comparing the Well Sequences for Soil+Worms+Lolium (S+V+P)/Soil+Worms+Lolium+PRP(S+V+P+M)

Interestingly it should be noted in sample S+V+P that the population corresponding to band D (prevalent in the profile S+V+P) is the same as (or very comparable to) those in bands E (prevalent in the profile S+P+M), 1 (prevalent in the profile S+V) and A (prevalent in the profile S+V+M), that is to say bacteria related to division TM7. The other predominant population in the worms/lolium combination (S+V+P) corresponding to band 8 could not be molecularly identified. The comparatively nearest sequence found by BLAST is indeed an unidentified bacterial clone derived from soils associated with trembling aspen (AN EF020305.97% identity) and the RDPII taxonomic assignment does not allow to associate this sequence with any division.

In the sample with PRP mineral formulation (S+V+P+M), the populations corresponding to the bands D and 8 are not prevalent anymore and another population (the most intense band) which DNA could not be purified seems to be directly activated through the PRP mineral solution or to benefit from the regulation effected on the other populations.

The molecular biology results given in the examples undeniably show that these changes in enzymatic activities are linked to changes occurring in the microbial communities. This therefore confirms that the mineral composition of formula (I) has a biological action. This biological action however depends on organisms such as plants and worms which are known for influencing the telluric microflora through the spheres of activity they create (rhizosphere and drilosphere). Changes in the microbial communities therefore result from a double process, (i) that of the mineral composition of formula (I), on the one hand, and (ii) that of some organisms, on the other hand.

Example 5

Figure 10A:
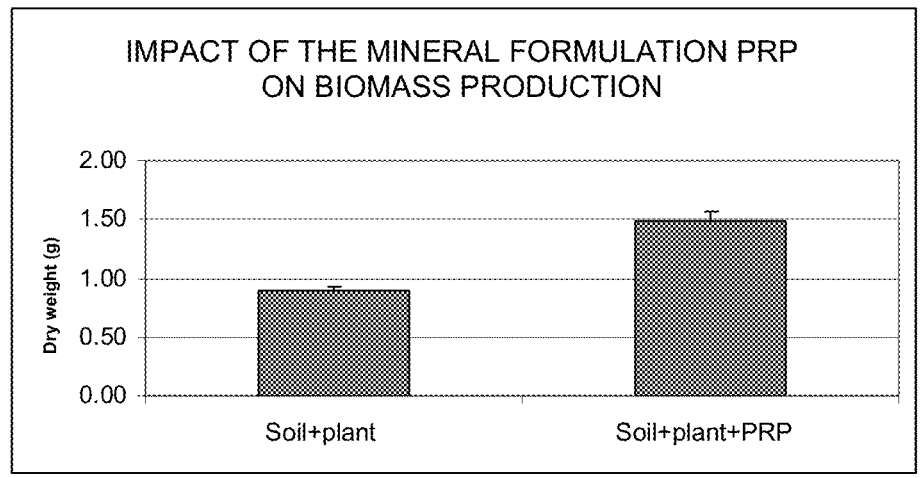
FIG. 10A illustrates the comparison between vegetation biomass production from (i) a soil with a vegetal cover and without earthworms (left bar) and from (ii) the same soil treated with the mineral composition of formula (I).
Figure 10B:
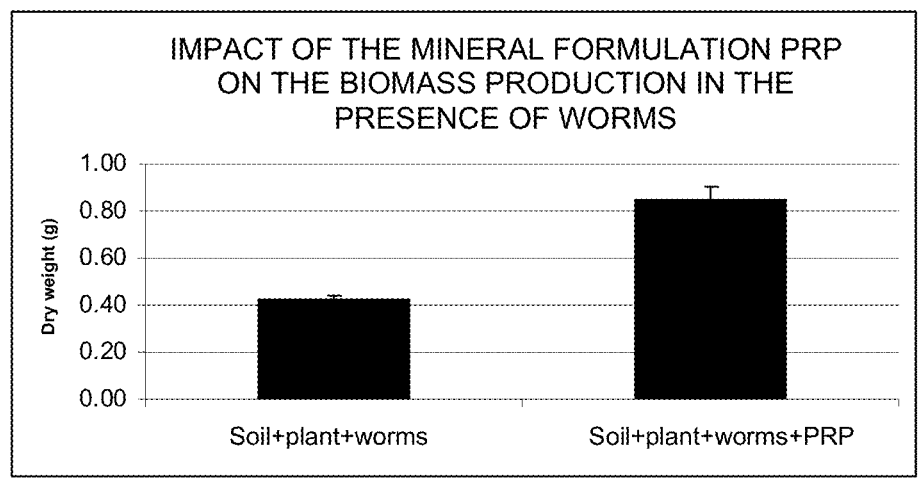
FIG. 10B illustrates the comparison between vegetation biomass production from (i) a soil with a vegetal cover and with earthworms (left bar) and from (ii) the same soil treated with the mineral composition of formula (I).

Effects of the Mineral Composition of Formula (I) on the Production of Vegetation Biomass The results are represented on FIGS. 10A and 10B.

The production of lolium in the presence of the mineral composition of formula (I) enables a significant doubling of the biomass dry weight. In the presence of earthworms, the same tendency can be observed.

TABLE 1

Synthesis of the results

|  | S | S + M | S + P | S + P + M |
|---|---|---|---|---|
| Biomass | Ø | Ø | 0.89 ± 0.03 | 1.49 ± 0.08 |
| Acid phosphatase | 542.49 ± 185.17 | 407.78 ± 98.88 | 501.39 ± 50.63 | 594.36 ± 95.25 |
| Alcaline phosphatase | 102.48 ± 23.87 | 110.47 ± 15.89 | 7.22 ± 6.49 | 68.36 ± 31.22 |
| α-glucosidase | 42.61 ± 39.62 | 103.75 ± 35.52 | 16.23 ± 8.13 | 68.61 ± 9.32 |
| β-glucosidase | 454.21 ± 106.98 | 512.81 ± 35.09 | 445.96 ± 180.41 | 624.93 ± 84.91 |
| N-acetylglucosaminidase | 153.60 ± 51.81 | 91.32 ± 27.90 | 117.45 ± 28.83 | 148.40 ± 14.69 |
| β-xylosidase | 186.96 ± 123.04 | 210.80 ± 59.66 | 24.51 ± 25.13 | 109.84 ± 4.53 |
| FDA | 24.87 ± 4.78 | 33.13 ± 4.11 | 27.31 ± 4.66 | 27.52 ± 3.62 |

|  | S + V | S + V + M | S + P + V | S + P + V + M |
|---|---|---|---|---|
| Biomass | Ø | Ø | 0.42 ± 0.01 | 0.85 ± 0.05 |
| Acid phosphatase | 538.93 ± 80.19 | 426.56 ± 63.56 | 557.07 ± 54.37 | 472.34 ± 71.13 |
| Alcaline phosphatase | 89.92 ± 14.66 | 99.56 ± 61.99 | 20.54 ± 24.76 | 55.04 ± 31.79 |
| α-glucosidase | 28.41 ± 16.23 | 113.52 ± 18.64 | 25.49 ± 26.99 | 105.27 ± 61.00 |
| β-glucosidase | 554.41 ± 86.25 | 620.37 ± 77.86 | 415.14 ± 38.06 | 613.14 ± 97.36 |
| N-acetylglucosaminidase | 106.41 ± 12.39 | 114.91 ± 33.63 | 160.19 ± 136.54 | 179.60 ± 14.45 |
| β-xylosidase | 23.17 ± 2.92 | 144.59 ± 35.75 | 63.29 ± 22.90 | 165.52 ± 6.97 |
| FDA | 29.16 ± 3.12 | 31.75 ± 2.38 | 25.82 ± 7.12 | 33.94 ± 7.25 |

TABLE 2

| Band(s) | Most related sequences | Identity % | Access number | Origin | RDPII classification | Bootstrap Confidence evaluation * |
|---|---|---|---|---|---|---|
| 1, A, D, E | Unidentified bacterium | 98% | EU283406 | activated sludge from membrane bioreactor | TM7 genera incertae sedis | 99% |
| C | Unidentified bacterium | 98% | DQ828869 | agricultural soil from Switzerland | Unclassified bacterium | — |
| 3 | Unidentified bacterium | 99% | AY820689 | drilling fluid, China | TM7 genera incertae sedis | 100% |
| 4 | Unidentified bacterium | 99% | AJ232811 | rhizoplane of *Trifolium repens* | TM7 genera incertae sedis | 93% |
| 15 | Unidentified bacterium | 97% | EF157158 | heavy oil seeps of the Rancho La Breatar pits | TM7 genera incertae sedis | 91% |
| 6, 7 | Unidentified bacterium | 99% | AF269024 | full-scale sewage treatment plant | TM7 genera incertae sedis | 100% |
| 8 | Unidentified bacterium | 97% | EF020305 | trembling aspen rhizosphere | Unclassified bacterium | — |
| 9 | Unidentified bacterium | 99% | EU134275 | soil from an undisturbed mixed grass prairie preserve, Oklahoma | Unclassified bacterium | — |

The invention claimed is:

1. A method of increasing the fertility of a soil by inducing an increase in at least one enzymatic activity contained in said soil, comprising:
adding to the soil an effective amount of a solid mineral composition comprising:
from 4.58% to 77.8% of calcium carbonate,
from 3.85% to 69.29% of dolomite,
from 5.7% to 12.4% of sodium chloride,
from 4.25% to 8.49% of lignosulphate,
from 0.37% to 2.44% of potassium sulphate,
from 0.01% to 0.07% of magnesium oxide, and
from 0.009% to 0.066% of elemental sulphur,
wherein the above percentages are weight percentages of each of the compounds, relative to the total weight of dry matter of said mineral composition, and
the solid mineral composition induces an increase in at least one enzymatic activity contained in said soil, selected from group consisting of (i) phosphatase, (ii) β-xylosidase, (iii) α-glucosidase and (iv) β-glucosidase.

2. The method according to claim 1, wherein said solid mineral composition induces an at least 1.5-fold increase of the at least one enzymatic activity.

3. The method according to claim 2, wherein said solid mineral composition induces an at least 2-fold increase of the at least one enzymatic activity.

4. The method according to claim 1, wherein said solid mineral composition induces an at least 2-fold increase of the phosphatase activity.

5. The method according to claim 1, wherein said solid mineral composition induces an at least 2-fold increase of the β-xylosidase activity.

6. The method according to claim 1, wherein said solid mineral composition induces an at least 2-fold increase of the α-glucosidase activity.

7. The method according to claim 1, wherein said solid mineral composition induces an at least 2-fold increase of the β-glucosidase activity.

8. The method according to claim 1, wherein said solid mineral composition induces detectable changes in the prevalence ratios between the respective bacterial taxons present in the soil.

9. The method according to claim 1, wherein said solid mineral composition induces an at least 1.5-fold increase in the production of vegetation biomass in said soil.

10. The method according to claim 1, wherein the solid mineral composition is added to the soil to be fertilized in an amount of from 0.01 to 0.10 kg/m$^2$.

11. The method according to claim 10, wherein the solid mineral composition is added to the soil to be fertilized in an amount of from 0.02 to 0.04 kg/m$^2$.

12. A solid mineral composition comprising:
from 4.58% to 77.8% of calcium carbonate;
from 3.85% to 69.29% of dolomite;
from 5.7% to 12.4% of sodium chloride;
from 4.25% to 8.49% of lignosulphate;
from 0.37% to 2.44% of potassium sulphate;
from 0.01% to 0.07% of magnesium oxide; and
from 0.009% to 0.066% of elemental sulphur,
wherein the above percentages are weight percentages, relative to the total weight of dry matter of said mineral composition, for increasing the fertility of a soil by causing an increase in at least one enzymatic activity contained in said soil, selected from (i) phosphatase, (ii) β-xylosidase, (iii) α-glucosidase and (iv) β-glucosidase.

13. The composition according to claim 12, wherein said solid mineral composition induces an at least 1.5-fold increase of the at least one enzymatic activity.

14. The composition according to claim 12, wherein said solid mineral composition induces an at least 2-fold increase of the at least one enzymatic activity.

15. The composition according to claim 12, wherein said solid mineral composition induces an at least 2-fold increase of the phosphatase activity.

16. The composition according to claim 12, wherein said solid mineral composition induces an at least 2-fold increase of the β-xylosidase activity.

17. The composition according to claim 12, wherein said solid mineral composition induces an at least 2-fold increase of the α-glucosidase activity.

18. The composition according to claim 12, wherein said solid mineral composition induces an at least 2-fold increase of the β-glucosidase activity.

19. The composition according to claim 12, wherein said solid mineral composition induces detectable changes in the prevalence ratios between the respective bacterial taxons present in the soil.

20. The composition according to claim 12, wherein said solid mineral composition induces an at least 1.5-fold increase in the production of vegetation biomass in said soil.

* * * * *